Nov. 27, 1962 — O. WEBBER — 3,066,213
OVEN FOR RECONSTITUTING FROZEN FOOD
Filed Oct. 31, 1960 — 2 Sheets-Sheet 1

INVENTOR
OWEN WEBBER

BY Cushman, Darby & Cushman
ATTORNEYS

Nov. 27, 1962     O. WEBBER     3,066,213
OVEN FOR RECONSTITUTING FROZEN FOOD
Filed Oct. 31, 1960     2 Sheets-Sheet 2
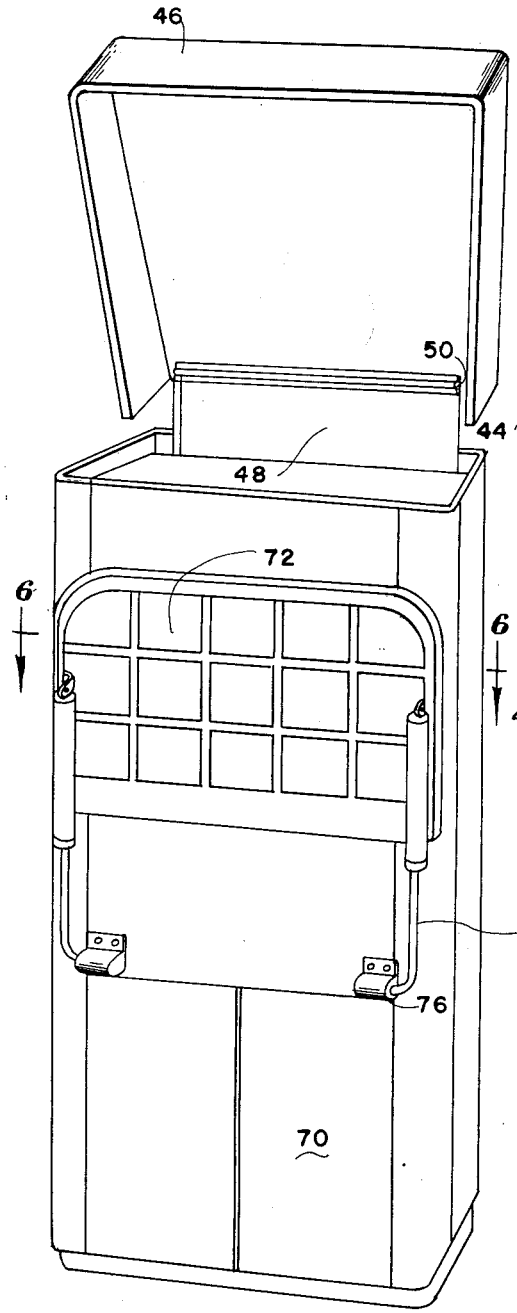
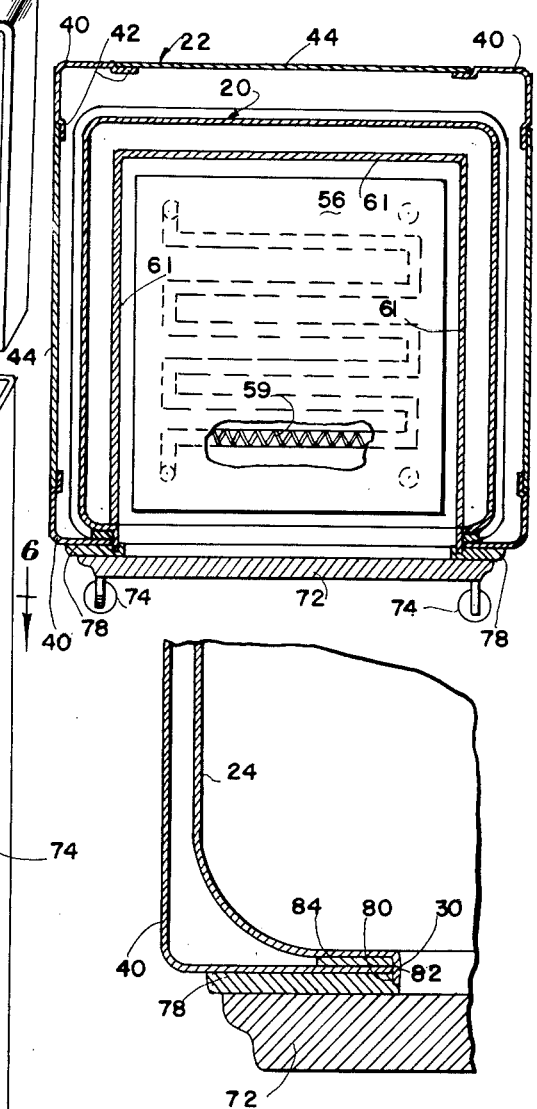
INVENTOR
OWEN WEBBER
BY *Cushman, Darby & Cushman*
ATTORNEYS 3,066,213
OVEN FOR RECONSTITUTING FROZEN FOOD
Owen Webber, 400 E. 52nd St., New York 22, N.Y.
Filed Oct. 31, 1960, Ser. No. 65,967
6 Claims. (Cl. 219—35)

The present invention relates to a new and improved oven for reconstituting relatively large quantities of frozen food for consumption, as in institutions, hospitals, and the like, where volume feeding practices are followed.

The frozen food industry has made great strides in recent years in the development of preparation and packaging procedures to the extent that frozen food products are economically desirable in commercial institutions as well as in the home. Commercial caterers, and the like, may prepare and freeze selected numbers of preplanned individual meals, providing a "food bank"—a large quantity of prepared frozen food meals which may be shipped to hospitals, for example, the food then being thawed and heated prior to serving.

A serious problem which limits the use of frozen food products for such volume feeding is the excessive time required to prepare the food for consumption. The frozen food must be thawed before it can be baked or otherwise prepared for use, and this is a time-consuming and otherwise undesirable feature of frozen foods, which has discouraged the widespread acceptance of such products in the field of volume feeding.

An object of this invention is to provide an oven for rapidly preparing frozen food for volume consumption, as in hospitals and institutions.

Another object of this invention is to provide a two-shell oven for preparing frozen food which is capable of withstanding steam under pressure, the oven including novel structural means.

Still another object of this invention is to provide an oven for preparing frozen foods which includes steam and electric heating means which may be used separately or together, to effect the desired temperatures and conditions within the oven.

Yet another object of this invention is to provide a new and improved oven construction, the structural joints therein and the various elements of the structure being capable of withstanding steam under pressure.

The oven is further lightweight, inexpensive, and simple in construction, and includes novel features which may best be made clear by reference to the specification, claims and the accompanying drawings, in which:

FIGURE 5 is a perspective view of the oven in FIGURE 4;

FIGURE 6 is a sectional view taken along line 6—6 of FIGURE 5; and

FIGURE 7 is an enlarged section view of the shell joint construction, according to a feature of this invention.

Figure 3:
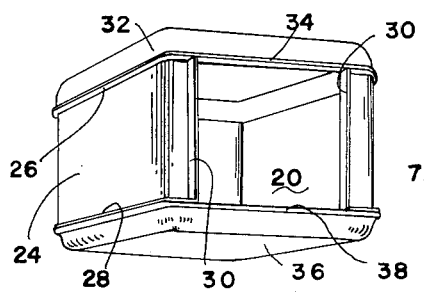
FIGURE 3 is a perspective view of the inner shell of the oven, which defines the oven chamber.
Figure 2:
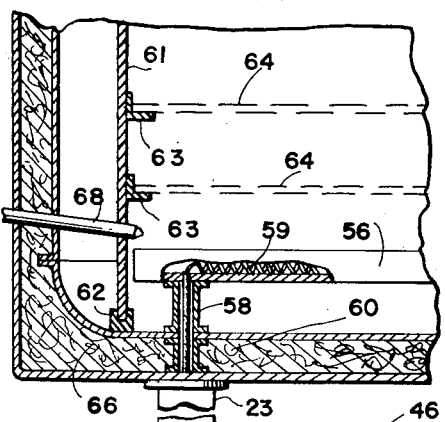
FIGURE 2 is a full section elevation view of the lower left-hand corner of the oven in FIGURE 1.
Figure 1:
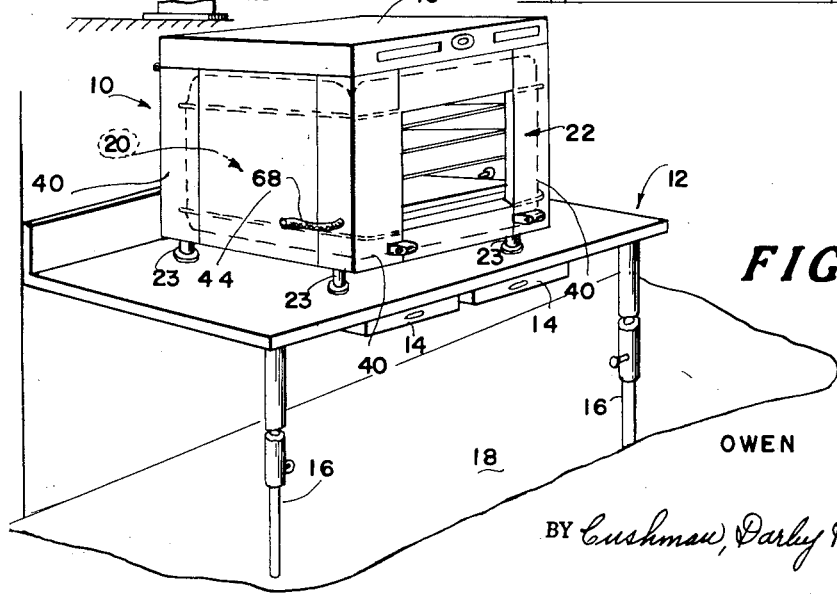
FIGURE 1 is a perspective view of a table model of the oven according to this invention, with the oven door and related elements omitted for clarity.

Reference is now made to the drawings, and specifically to FIGURES 1 to 3. Figure 1 shows an oven 10 setting on a table 12, the table 12 having drawers 14 and adjustable legs 16 which are secured within a concrete floor 18 by suitable means (not shown).

The oven 10 includes an inner shell 20 and an outer shell 22. Four support spools 23 are secured to the bottom side of the outer shell 22, to provide support for the oven 10 on the table 12.

Referring to FIGURE 3, the inner shell 20, which defines the oven chamber, includes a saddle member 24 having top flanges 26, bottom flanges 28, and end flanges 30 extending outwardly therefrom. A top pan 32 having flanges 34 extending therefrom is secured to the top flanges 26 of the saddle member 24, as by welding. In a like manner, a bottom pan 36 having flanges 38 is secured to the adjacent bottom flanges 28 of the saddle member 24. The inner shell is thus preferably a 3-piece construction, the pans 32 and 36 and the saddle member 24 preferably being of die pressed stainless steel and securely joined, as mentioned, by welding so as to provided a pressure-tight construction.

The outer shell 22 includes vertically disposed corner members 40 (FIGURES 1 and 6). The outer shell construction, as best shown in FIGURE 6, is substantially identical to the structure of the oven 10 in FIGURE 1, except for the modification of the bottom portion of the oven 10 to provide a lower cabinet 70. The corner members 40 include flanges 42 which are recessed inwardly of the corner members 40 and are generally parallel thereto. The construction of the outer shell 22 is completed by the wall panels 44 wihch fit within the recessed flanges 42, and are thereby generally coplanar with the corner members 40, providing a smooth exterior wall construction. In this regard, the corner members 40 have recessed flanges 42 also at the top and bottom thereof, providing for wall panels 44 at the top and bottom, as well as the sides.

A top cover 46 is vertically pivoted by a piano lever 48 and pin 50, as shown in FIGURE 5, this top cover 46 being identical in construction to the top cover 46 in FIGURE 1. The top cover 46 provides access to suitable controls (not shown) for the oven, such as timing mechanisms, switches, fuses and the like, these elements not being a part of the present invention. The wall panels 44 may have spaced apart apertures therealong (not shown) adjacent the recessed flanges 42, to facilitate plug welding of the members together.

The top pan 32 of the inner shell 20 has an upwardly extending recessed portion 52, within which a circulating fan 54 is mounted. The recessed portion 52 thereby provides additional structural strengthening of the top pan 32, to accommodate the weight of the circulating fan 54.

FIGURES 2 and 6 show an electric heating element 56, which is mounted above the bottom pan 36 by mounting spools 58. An electric heating panel 57, preferably of the "Calrod" type (FIGURE 4) may be disposed below the fan 54 to provide additional heating of the oven chamber. A clearance is preferably provided between the sides of the heating element 57 and the walls of the oven to afford a free circulation of air. In a like manner, a heating panel (not shown) may be disposed below the heating element 56 adjacent the bottom of the oven chamber to provide augmented heat to the interior of the oven. The heating element 56 is preferably a closed, rectangular construction, wherein resistance wires 59 are suitably disposed therein, and is made of cast metal or ceramic construction. The wires 59 are connected to a suitable power source and timing means (not shown), as will be apparent to one skilled in the art. Spacer spools 60 provide support for the electric heating element 56 between the inner shell 20 and the outer shell 22, thereby relieving the weight thereof. In this regard, the mounting spools 58, spacer spools 60, and support spools 23 are coaxially mounted, as shown in FIGURE 2, to transmit the load directly to the table, and to provide a rigid means for securing the inner shell 20 to the outer shell 22.

Vertically mounted within the inner shell 20 at the sides thereof are bracket plates 61, which are secured to the top pan 32 and bottom pan 36 by guide members 62.

Suitable L members 63 are secured to the bracket plates 61, as shown in FIGURE 2, providing support for a number of trays 64. The space between the inner shell 20 and the outer shell 22 is filled with insulating material 66, such as fiber glass or the like. A water supply means 68 is provided for introducing water into the oven chamber. The water supply means 68 may provide an injection of a measured amount of water, or automatic control means may be provided whereby the water supply will be shut off when a desired pressure is attained within the oven chamber. There is also provided a suitable pressure relief valve (not shown), drain valve (not shown), and humidity control means (not shown), for the oven chamber, all of which are of conventional construction.

Figure 4:
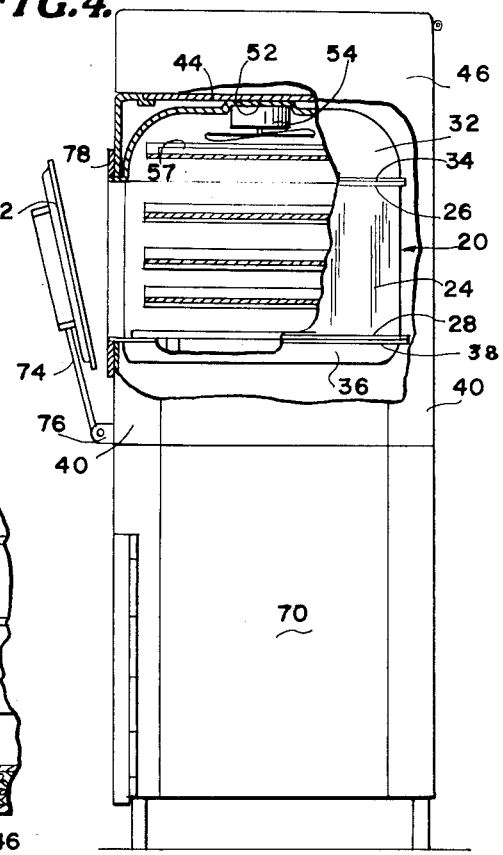
FIGURE 4 is a side elevation view, partially broken out, of the cabinet model of the oven in FIGURE 1.

FIGURES 4 and 5 show a floor model of the oven 10 of FIGURE 1, the oven 10 being provided with conventional cabinets 70 integral therewith.

In FIGURE 4, the corner members 40 may terminate at their lower ends, as in FIGURE 2, providing an oven 10 which is removable from the cabinet 70; or an integral structure may be provided wherein the corner members 40 extend the height of the cabinet 70, with suitable clips (not shown) mounted thereon to accommodate the bottom wall panel 44. In FIGURES 4 and 5, the oven 10 includes an oven door 72 which is pivotally secured to the oven cabinet 70, the underside of the door 72 having rods 74 extending therefrom. The rods 74 are pivotally secured to the cabinet 70 by trunnions 76. The front face of the oven 10 has a gasket 78 of rubber or the like extending therearound, providing a seal between the door 72 and the outer shell 22 of the oven 10. The door 72 is maintained in a pressure-tight engagement with the outer shell 22 of the oven 10 by suitable dogs or the like (not shown), as will be apparent to one skilled in the art. Means are also provided (not shown) for preventing the opening of the door 72 when the oven chamber is under superatmospheric pressure. An equivalent arrangement is provided for the oven 10 in FIGURE 1, except the trunnions 76 are mounted on the lower front wall of the oven 10.

FIGURES 6 and 7 show the means for securing the front wall of the inner shell 20 to the outer shell 22. The outside walls 80 of end flanges 30 abut the end surfaces 82 of the corner members 40 and are appropriately secured, as by socket welding. The end flanges 30 may have perforations (not shown) at spaced distances therealong, to facilitate plug welding of the flanges 30 to the corner members 40. A spacer member 84 is disposed between the flange 30 of the inner shell 20 and the inside surface of the corner member 40, providing a relatively rigid structure.

Reference will now be made to the operation of the oven 10, to reconstitute or otherwise prepare food which has been frozen, for example, to the order of −10° F. The oven door 72 is opened and frozen food is placed on the trays 64 within the oven chamber, and the door 72 is closed.

Water is admitted to the oven chamber by the water supply means 68 and so disposed as to be sprayed onto the underside of the lower elemented deck, and electric power is provided to the resistance wires 59 of the electric heating element 56, thereby raising the temperature of the frozen food above the thawing point. The water which has been admitted into the oven chamber is elevated to its boiling temperature by means of the electric heating element 56, providing superatmospheric steam pressure within the oven 10. The pressure, temperature, and humidity of the oven chamber are regulated by conventional controls, thereby providing a controlled atmosphere for thawing and heating the frozen food. The oven 10 may be additionally utilized to bake the frozen food, or any other food materials as may be desired, up to temperatures of 500° F. by securing the water supply means 68, and thereby utilizing the electric heating element 56 to heat the oven interior. The fan 54 provides for circulation of the atmosphere within the oven chamber.

The novel oven construction as set forth herein provides a lightweight and inexpensive oven which includes new improved structural means.

It will, therefore, be seen that there has been provided by this invention a structure in which the various objects hereinbefore set forth, together with many practical advantages, are successfully achieved.

As various possible embodiments may be made of the mechanical features of this invention, all without departing from the scope thereof, it is to be understood that all matters herein set forth or shown in the accompanying drawings is to be interpreted in an illustrative and not in a limiting sense.

What is claimed is:

1. Apparatus for reconstituting frozen foods comprising: an inner shell defining an oven chamber including a saddle member with top and bottom flange means extending therefrom, a top pan including flange means secured to the top flange means of said saddle member, a bottom pan including flange means secured to said bottom flange means of said saddle member; an outer shell including corner members, said corner members including flange means extending inwardly therefrom, wall members secured to said flange means of said corner members, said wall members being generally coplanar with said corner members; means for securing said inner shell to said outer shell; door means providing access to the oven chamber; said top pan including an outwardly recessed portion joined to said outer shell; fan means extending within said oven chamber and secured to said outer shell and said recessed portion whereby circulation is provided therein; means for providing electric heat for said oven chamber and means for providing introduction of steam within said oven chamber whereby frozen foods are reconstituted by the combined effect of the circulated steam and the electric heat.

2. Apparatus defined in claim 1 wherein said means for joining said inner shell to said outer shell includes a plurality of spacer means mounted between said inner shell and said outer shell.

3. Apparatus defined in claim 1 wherein said saddle member includes flange means thereon adjacent an opening therethrough, and said corner member adjacent the opening includes flange means thereon cooperating with said saddle member flange means, and means for joining the side of said saddle member flange means with the end of said corner member flange means.

4. Apparatus defined in claim 3 including a spacer member mounted adjacent said flange means.

5. Apparatus defined in claim 1 wherein said means providing electric heating of said oven chamber includes a generally flat member, electric wire means mounted within said flat member; and means for mounting said electric heating means within said inner shell.

6. Apparatus defined in claim 1 including control means carried above said top pan; and second door means joined to said outer shell at the top thereof and providing access to said control means.

References Cited in the file of this patent

UNITED STATES PATENTS

| | | |
|---|---|---|
| 1,532,086 | Shroyer | Mar. 31, 1925 |
| 2,490,076 | Maxson | Dec. 6, 1949 |
| 2,500,219 | Troupe | Mar. 14, 1950 |
| 2,683,795 | Sheidler | July 13, 1954 |
| 2,851,029 | Fry et al. | Sept. 9, 1958 |
| 2,899,534 | Sjolund | Aug. 11, 1959 |
| 2,906,620 | Jung | Sept. 29, 1959 |